Feb. 8, 1944.    L. D. MARTIN    2,341,460
FILM GATE FOR MOTION PICTURE APPARATUS
Filed May 1, 1941

LOUIS D. MARTIN
*INVENTOR*

BY Newton H. Perrius
George A. Gillette Jr.
ATTORNEYS

Patented Feb. 8, 1944

2,341,460

UNITED STATES PATENT OFFICE 2,341,460

FILM GATE FOR MOTION PICTURE APPARATUS

Louis D. Martin, Rochester, N. Y., assignor to Eastman Kodak Company, Rochester, N. Y., a corporation of New Jersey Application May 1, 1941, Serial No. 391,366

4 Claims. (Cl. 88—17)

This invention relates to motion picture apparatus, such as cameras and projectors using strip film, and more particularly to a novel construction of the "gate" or guide through which the film passes across the optical axis.

In motion picture cameras and projectors the film strip is carried past the lens in intermittent steps by means of a Geneva-gear drive, a pull-down claw or other suitable mechanism, through a "gate" or guide that may be opened for ready insertion of the film in threading it through the machine. One member of the gate is usually spring-pressed to assure the constant location of the film in the focal plane, and also to accomplish instant stoppage of the film after each step of advance movement.

If the edges of the film passing over the marginal guides of the gate are clean and smooth, the film will be moved intermittently without undue strain or breakage. At times, when a film becomes dirty, or if it is not waxed, it may move easily for some distance and then may be suddenly strained because of the extra friction in the gate caused by gumminess, dirt, rolled-up or detached particles of emulsion. When this occurs the film may break or the perforations may be damaged.

Means have been suggested whereby the sudden increase of tension from such causes as have just been mentioned may be automatically relieved before damaging strains can occur. As most of these structures are mechanically intricate and require considerable adjustment or replacement, they are not entirely satisfactory. Furthermore, none of them are operative when the film is run in a reverse direction, to exhibit a picture "running backward" as is sometimes desirable; in fact, in some known constructions the film would be jammed if any attempt were made to run the film in reverse.

It is an object of this invention, therefore, to provide a resilient gate member which will be simple, free from adjustment variations, and inexpensive to manufacture, which will permit the film to move with equal freedom in either direction and which will relieve any drag or jamming before the film can be damaged. A preferred and simple construction embodying this invention is illustrated in the accompanying drawing, in which Fig. 1 is a side elevation of a typical motion-picture projector with this improved gate construction;

Figure 1:
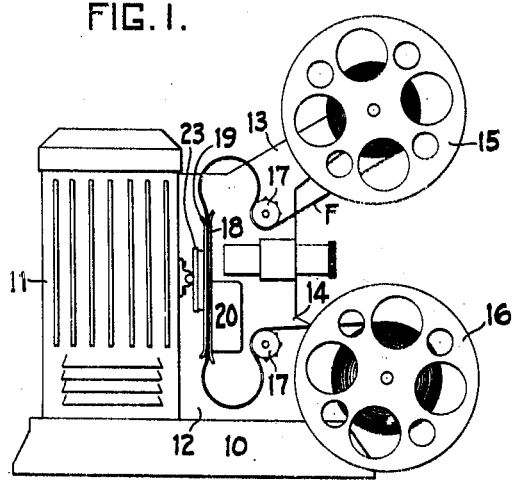
Figure 2:
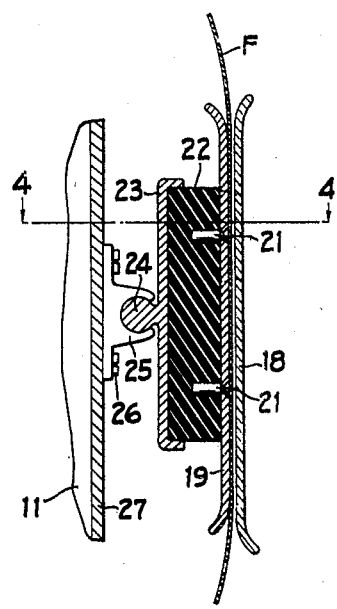
Fig. 2 is a vertical section, on an enlarged scale, of the gate and associated parts in normal relation.
Figure 4:
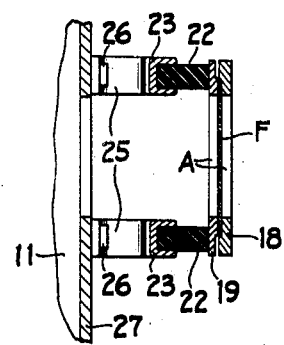
Fig. 4 is a sectional plan view on line 4—4 of Fig. 2.

The projector indicated in Fig. 1 may be considered as typical of structures to which this invention may be applied, and is shown as having a base 10 supporting a suitable lamp house 11 and a mechanism plate 12, the latter having suitable extensions 13 and 14 on which are mounted, respectively, the supply reel 15 and the receiving reel 16. The film F passes from the supply reel in the usual manner over feed sprockets 17 and through the gate, which comprises a fixed member 18 and a movable member 19. The usual loops at the top and bottom of the gate permit the film to be advanced intermittently by any suitable mechanism contained in a casing 20. The gate members are designed as usual to contact the film only along narrow marginal portions, as clearly shown in Fig. 4.

The gate member 19 is pinned as at 21 to a pair of pads 22, spaced apart in holders 23 so that they will be clear of the projection aperture A in the gate members. These pads are made of a resilient material which tends to restore itself to normal, such as natural or synthetic rubber, elastic felt, viscose compositions, etc. The holders 23 have extensions 24 of approximately cylindrical section, and are capable of limited rotation in socket members 25 attached by screws 26 to the front wall 27 of the lamp housing 11. Obviously the place and manner of support for the sockets 25 may be adapted to the particular design of the machine to which the invention is applied.

Because of the cylindrical form of the members 24 the pads 22 are self-aligning, that is, any inaccuracy in the parallelism of the supporting wall 27 and the gate members 18 and 19 will not affect the evenly-distributed pressure exerted by the resilient pads which tend to press the edges of gate member 19 against the film, whereby the latter exerts an even "drag" on both edges for the full height of the pads.

Figure 3:
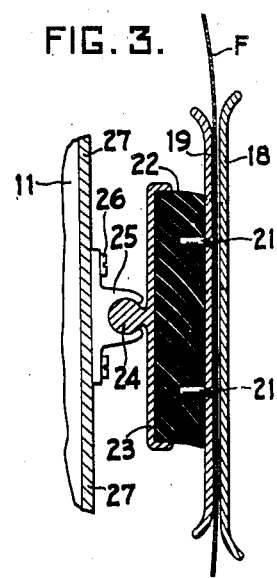
Fig. 3 is a similar view indicating the result of increased strain on the film.

If an irregularity in the film surface, such as a rolled-up fragment of emulsion, a burred scratch, or dirt enters the gate, an unusual tension is set up in the film. The gate member 19 will yield under such strain because the resilient material of the pads 22 or either of them will actually be displaced vertically as indicated by the distorted cross-hatch lines in Fig. 3. As this downward distortion occurs the actual thickness of the pads as measured on a line normal to the gate members diminishes slightly, and although this decrease may be only fractional thousandths of an inch, it will carry the gate member 19 away from the member 18 and relieve the excessive strain on the film. As soon as the bump or foreign matter passes along with the film the pads 22 will resume their normal contour and dimensions.

Figure 5:
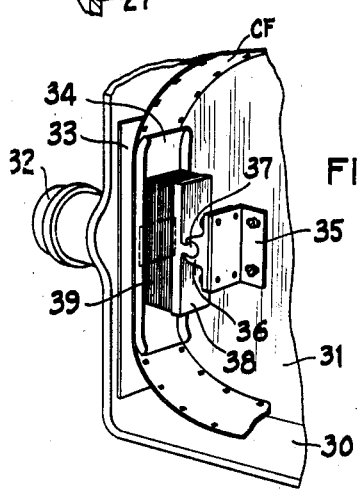
Fig. 5 is a perspective view of a motion-picture camera with this invention incorporated therein, parts being broken away for clearness of illustration.

In Fig. 5 is illustrated a portion of a typical moving picture camera of the 16 mm. size. The casing 30, carrying the usual mechanism plate 31 and lens 32, is broken away to show the front and rear members 33 and 34, respectively, of the film gate, between which the film CF is intermittently moved by suitable feed mechanism, not shown. An adjustable bracket 35 attached to the mechanism plate carries a socket 36 with which a cylindrical part 37 of a holder 38 cooperates in the same manner as part 24 previously described. A pad 39 of resilient material serves the same purpose as the pad 22, that is, it creates a constant pressure of the gate member 34 against the film. As in the previously described construction, the pad 39 will yield in the direction of the film movement whenever any unusual friction is set up by dirt or roughness, etc., and will immediately resume its normal condition when the obstruction has passed through the gate.

It should be noted that the resilient material when applied to a projector is shown as consisting of two pads, this being necessary in order that the light passing through apertures A will be unobstructed. In a camera this condition is not encountered, as the light rays from the lens stop at the film, and the rear gate member may be backed up with one solid pad of resilient material.

A novel feature of the present invention, as has been mentioned, is that the above-described construction is operative in either direction—a very essential requirement in motion-picture apparatus. It frequently happens that it is desired to repeat the projection of a scene, without rewinding the entire reel, and this can be done on some projectors, and in some cameras, by operating the film feeding mechanism in reverse. When this is done with the present invention the resilient pads will flex and draw the member 19 away from the film. The flexing will, of course, be upward if the film when reversed runs in that direction.

It is necessary, of course, to have the correct initial pressure applied to the gate member 19. This may be obtained and slight variations in dimensions may be overcome by having the member 18 adjustable forward and backward. Many ways of doing this are possible, so the drawing does not illustrate any means therefor. Once the correct pressure is attained there should be no variation unless the pads 22 lose their resilient qualities.

I am aware that mechanical devices operating through toggle levers, bell-cranks or their equivalents have been proposed, to regulate the drag of a gate member on a moving strip of film. All of these are capable of passing a film in one direction only, and if the film is reversed the mechanism might clamp the gate against the film, and breakage would probably result. A freely-acting resilient member exerting constant pressure against the film is a simple and inexpensive solution of this problem.

Obviously the proportions and the arrangement of the details are somewhat a matter of design, and therefore the invention is to be considered not only with reference to the specific showing herewith, but as embodying any and all modifications that fulfill a reasonable interpretation of the following claims.

Having now particularly described my invention what I desire to secure by Letters Patent of the United States and what I claim is:

1. A motion picture apparatus comprising a film gate for a moving film strip and including fixed and movable gate members having substantially parallel film engaging faces, and a supporting means for said movable gate member and including a body of flexible and resilient material having such resiliency and volume that a change in frictional engagement between the moving film strip and the film engaging face of said movable gate member, causes a component of movement of said movable gate member toward or away from said fixed gate member without substantially changing the parallelism between the film engaging faces of said gate members.

2. A motion picture apparatus comprising a film gate for a moving film strip and including fixed and movable gate members having substantially parallel film engaging faces, and a supporting means for said movable gate member and including a body of flexible and resilient material having a plane surface substantially parallel to the film engaging surface of said fixed gate member and upon which said movable gate member is mounted and which plane surface is longitudinally displaceable by change in frictional engagement between the moving film strip and said movable gate member, has a component of movement toward or away from said fixed gate member, and yet remains substantially parallel to the film engaging surface of said fixed gate member.

3. A motion picture apparatus comprising a film gate for a moving film strip and including fixed and movable gate members having substantially parallel film engaging faces, and a supporting means for said movable gate member and including a block of flexible rubber material constituting the sole support for said movable gate member and having a plane surface substantially parallel to the film engaging surface of said fixed gate member and upon which said movable gate member is mounted and which plane surface is longitudinally displaceable by change in frictional engagement between the moving film strip and said movable gate member, has a component of movement toward or away from said fixed gate member, and yet remains substantially parallel to the film engaging surface of said fixed gate member.

4. A motion picture apparatus comprising a film gate through which a film strip is movable in either of two directions and including fixed and movable gate members having substantially parallel film engaging faces, and a supporting means for said movable gate member and including a body of flexible and resilient material in unstrained condition supporting the movable gate member with its film engaging face spaced the distance of a normal film thickness from the face of said fixed gate member, and which body of flexible and resilient material is itself adapted and arranged to permit longitudinal movement of said movable gate member in either direction of film movement by a change in frictional engagement between the moving film strip and the film engaging face of said movable gate member, to cause a component of movement of said movable gate member toward or away from said fixed gate member, and also to maintain substantial parallelism between the film engaging faces of said gate members.

LOUIS D. MARTIN.